United States Patent [19]

Smart et al.

[11] Patent Number: 5,597,963
[45] Date of Patent: Jan. 28, 1997

[54] SUBMERSIBLE STREAMLINED METER WITH A PITOT TUBE FOR MEASURING WATER FLOW IN AN OPEN CHANNEL

[75] Inventors: Graeme M. Smart; Michael P. Hayes; Stephen G. George, all of Christchurch, New Zealand

[73] Assignee: National Institute of Water and Atmospheric Research, Wellington, New Zealand

[21] Appl. No.: 256,033

[22] PCT Filed: Dec. 23, 1992

[86] PCT No.: PCT/NZ92/00009

§ 371 Date: Oct. 6, 1994

§ 102(e) Date: Oct. 6, 1994

[87] PCT Pub. No.: WO93/13425

PCT Pub. Date: Jul. 8, 1993

[30] Foreign Application Priority Data

Dec. 23, 1991 [NZ] New Zealand .................... 240494
Oct. 20, 1992 [NZ] New Zealand .................... 244811

[51] Int. Cl.⁶ ........................................ G01F 1/46
[52] U.S. Cl. ........................ 73/861.65; 73/170.14
[58] Field of Search ................ 73/861.65, 861.66, 73/861.42, 861.44, 861.47, 170.14

[56] References Cited

U.S. PATENT DOCUMENTS

| 3,599,488 | 8/1971 | Mather | 73/178 R |
|---|---|---|---|
| 4,163,387 | 8/1979 | Schroeder | 73/178 R |
| 4,182,174 | 1/1980 | Proctor | 73/861.65 |
| 4,184,149 | 1/1980 | Baker et al. | 73/861.65 |
| 4,304,137 | 12/1981 | Mott | 73/861.65 |
| 4,378,696 | 4/1983 | DeLeo et al. | 73/861.65 |
| 4,783,994 | 11/1988 | Ashby | 73/861.65 |
| 5,233,865 | 8/1993 | Rossow | 73/861.65 |

FOREIGN PATENT DOCUMENTS

| 133471 | 4/1946 | Australia . |
| 138239 | 9/1947 | Australia . |
| 138848 | 4/1921 | United Kingdom . |
| 764206 | 12/1956 | United Kingdom . |

Primary Examiner—Richard Chilcot
Assistant Examiner—Harshad Patel
Attorney, Agent, or Firm—Ladas & Parry

[57] ABSTRACT

A gauging meter including a streamline housing at a forward end of which a pitot type tube, the tail end of the housing having a tail fin of fins, the housing being connected to a cable or rod which, in use, suspends or supports the housing in liquid flow, the housing incorporating electronic measuring device for optionally measuring liquid depth, liquid velocity head and temperature, the sensed measurements being either stored within the housing or multiplexed and sent to a remote controller for storage and recording or viewing.

8 Claims, 1 Drawing Sheet

5,597,963

SUBMERSIBLE STREAMLINED METER WITH A PITOT TUBE FOR MEASURING WATER FLOW IN AN OPEN CHANNEL

FIELD OF THE INVENTION

The invention relates to a flow gauging system which can measure the velocity profile, the bed profile and/or other liquid condition of liquid flows and more particularly relates to a flow gauging system for use in open channel flows, such as rivers.

BACKGROUND

Various types of current meter have been used in the past to gauge the volumetric flow race of rivers. Typically the river velocity is measured by a propeller or other rotating device, suspended with a weight from a cable. This is done at intervals across a river. The velocity is calculated from the rate of rotation of the device and the river depth is measured by noting the length of cable wound out. Flow rate is the product of velocity and cross-sectional area, which is calculated from the measured depth and the horizontal distance between measurements.

This technique has serious disadvantages. Firstly, in high flows the propeller type meter is carried downstream by its own drag, drag on the weight and cable and drag from debris caught on the meter assembly. Thus the meter does not hang vertically below the gauging point and it is usually necessary to apply a vertical angle correction to estimate the true depth of flow.

Secondly, the drag increases with the square of the river velocity and becomes so great that it is not practical to measure river velocities above flow rates of about 18 ft/sec with the traditional equipment.

Thirdly, because propeller type meters have inertia, in a fluctuating velocity field the measured velocity results from the damped time average of the disturbing forces acting on the rotating device. Because velocity fluctuations are related to the square root of these forces, where the disturbing forces are not evenly distributed about a mean value, as occurs in the wake of any protrusion into the flow, the time average of the forces converted to a velocity, is not the same as the average of individual velocity fluctuations. Thus the propeller type device gives a biased estimate of average velocity. For example, suppose that disturbing forces of 9 units, −1 units, 0 units and −4 units occur over successive short time intervals and these forces arise from velocity fluctuations of 3 ft/sec., −1 ft/sec., 0 ft/sec. and −2 ft/sec. The true mean of the fluctuating velocity is the sum (3−1+0−2) divided by four which equals zero feet per second. Conventional propeller type meters average the disturbing forces (9−1+0−4 divided by four), which corresponds to an incorrect mean of one foot per second for the fluctuating velocity.

Fourthly, the mean velocity at a fixed depth below the surface generally varies depending on the depth at which a measurement is made in a river. Conventional meters are used at a fixed depth or depths and standard assumptions are applied to relate the fixed depth velocity to the true depth— averaged mean velocity. Whilst these assumptions are applicable to a "standard" river situation, many rivers are non-standard or become non-standard at certain flow rates. The only way to determine whether a measurement at 0.6 of the total depth is representative of the mean velocity is to take readings at other depths, say 0.2 and 0.8 of the total depth. The only way to be sure that these three readings are truly representative is to take even more fixed depth measurements. This is a time consuming and therefore costly process Finally, the inherent dangers of flood gauging and weather conditions usually mean that flow calculations are delayed until an operator reaches shelter. If errors are found at this point in is often too late to repeat a gauging measurement.

SUMMARY OF THE INVENTION

An object of the invention is therefore to overcome the above-identified disadvantages and provide beers with a useful alternative.

According to a broadest aspect of the invention there is provided a gauging meter including a streamlined housing at a forward end of which is a pitot tube, the other or tail end of the housing can have a tall fin or fins, the housing being connected no a cable or rod which, in use, suspends or supports the housing in a liquid flow, the housing incorporating electronic measuring means for optionally measuring liquid depth, liquid velocity head and temperature, the sensed measurements being either stored within the housing or multiplexed and sent to a remote controller for storage and recordal or viewing.

The pitot tube end of the housing can have a forwardly directed pitot port and one or more static pressure ports directed at right angles to the longitudinal axis of the pitot port. The static pressure port(s) indicate the true depth of water immediately above the housing.

The pitot tube end of the housing with its intrinsic streamlined shape has much lower drag than a propeller type instrument, thus increasing the upper velocity limit.

The electronic pressure detection system can respond rapidly and take measurements many times per second so that a turbulent pressure signal is not obtained. The velocity can therefore be calculated from the individual pressure measurements and not from pressures averaged over a second or longer. This technique reduces any velocity bias.

The electronic measuring system can operate continuously as the meter is lowered to and raised from the river bed. At any point on the way down or up, both the velocity and depth are measured and may be integrated to give the depth averaged velocity.

The electronic measuring means can be pressure transducers located close to the ports. Outputs from the pressure transducers are analyzed to give absolute pressure and a pressure differential. These outputs are typically fed by a preamplifier to a multiplexer to be transmitted directly or indirectly to the controller which records and displays and can process the data for immediate analysis.

The transmission line can be a slender double conductor cable similar to that used for conventional propeller type velocity meters, a fibre optic cable or a multi-core cable or a radio signal.

Further aspects of the invention which should be considered in all its novel aspects will become apparent from the following description which is given by way of example only.

BRIEF DESCRIPTION OF THE DRAWINGS

An example of the invention will now be described with reference to the accompanying drawing in which.

DETAILED DESCRIPTION

The example of the invention will be described with reference to its use for gauging river conditions.

Figure 1:
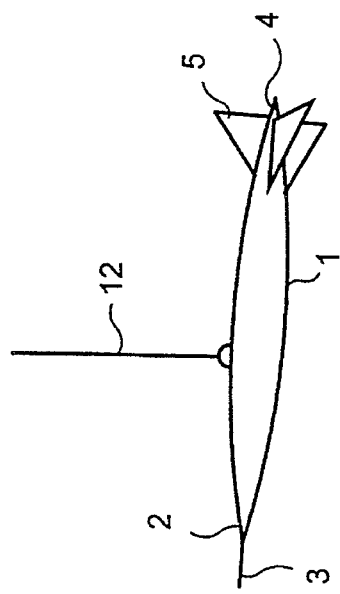
FIG. 1 is a side view of a typical flow meter according to the present invention.

The gauging meter consists of a streamlined housing 1 at a forward end 2 of which is a pitot tube 3. The other or tail end 4 of the housing 1 has a tail fin or fins 5. The housing 1 is weighted or attached to a weight and can incorporate therein a power supply or alternatively power can be supplied externally. The housing 1 incorporates an electronic mechanism for sensing water conditions preferably in association with the pitot tube 3. The pitot tube 3 at the forward end of the housing 1 includes in the example shown, pressure sensing ports (not shown in FIG. 1 but indicated as 6 and 7 in FIG. 2). Each of the sensing pores has associated therewith one or more pressure transducers. Preferably the pressure transducers are located close to the pressure ports to eliminate resonance in the connections between the port openings and the transducers.

Figure 2:
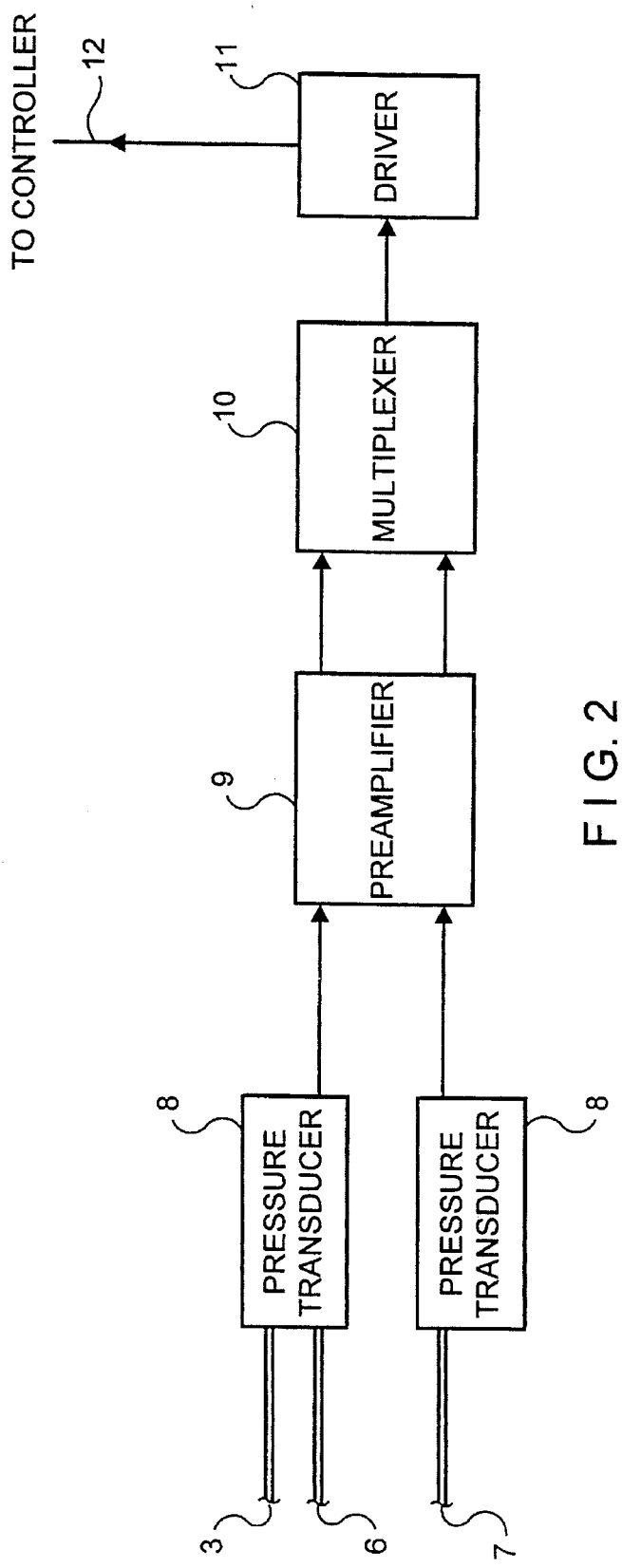
FIG. 2 is a schematic circuit diagram for the electronic means contained within the gauging meter shown in FIG. 1.

As indicated in FIG. 2 the pitot port 3 and the static port 6 are linked to a differential pressure transducer 8 the output of which is forwarded to a preamplifier 9 which amplifies the signal for transmission to a multiplexer 10 which converts the data for transmission via a line driver 11 through, in this example, a cable 12 to a computer controller (not shown) in which the data is recorded and/or displayed. Alternatively the data may be stored in memory for subsequent downloading to a controller for analysis.

The other static port 7 senses absolute pressure and its output is also forwarded via the preamplifier 9 to be multiplexed for transmission via the cable 12 to the controller.

It is appreciated that in addition to the depth and velocity measurements obtainable, other sensors, for example a temperature sensor, can be incorporated and measurement outputs from the other sensors are transmitted to the controller in a similar manner.

The controller can be programmed to receive, analyze and process the data from the housing 1 and create this as useful comparative data.

In use the housing 1 is lowered on cable 12 at intervals across a river flow to obtain data on the river conditions and a profile of the river bed. The meter can be used to collect data as it is being lowered and raised or when held at a fixed depth. The data can be stored in the computer controller for either immediate review or storage and subsequent analysis, The invention therefore provides a meter which can immediately indicate a more accurate estimate of true velocity and true depth of the water. An advantage of the invention is that the meter is able to read and measure river flows faster than 18 ft/sec. which has been impractical with existing suspended propeller type velocity meters.

Thus by this invention there is provided a gauging meter for use in liquid flows such as rivers to measure and profile the liquid flow and measure other conditions.

A particular example of the invention has been described and it is envisaged that improvements and modifications can take place without departing from the scope of the appended claims.

What is claimed is:

1. An electronic gauging device comprising:
   a housing,
   means connected to the housing to submerge and support the housing in water flowing in an open channel,
   said housing having a streamlined shape for flow of the water thereon, said housing having a forward end facing the water flowing theretowards and a rear end beyond which the water flows away from the housing,
   a pitot tube connected to said housing and projecting forwardly thereof,
   a stabilizing tail fin assembly on said housing at said rear end thereof,
   said pitot tube having first, second and third pressure sensing ports,
   transducer means connected in proximity to said ports to produce electrical signals indicative of pressures measured at said pressure sensing ports, and
   electronic measuring means connected to said transducer means for producing output signals indicating velocity of flow of said water, and absolute pressure of said water which represents depth of immersion of said housing in said water flow in said channel, said electronic measuring means operating rapidly in succession a plurality of times per second such that the output signal of velocity of flow of said water is calculated from instantaneous pressure measurements not exceeding one second in duration, and
   wherein said electronic measuring means calculates vertical depth of water above the pitot tube based on the pressures measured at said ports, so that at any point on the way down or up of the housing in the channel, both the velocity of water flow and depth of the device are measured to give a vertical sample through the water flow to give the depth and average flow velocity in the channel.

2. An electronic gauging device according to claim, wherein said electronic measuring means operates continuously as the housing is lowered to and raised from a channel bed in which the water is flowing.

3. An electronic gauging device according to claim 2, wherein said electronic measuring means includes a controller which is operated at said plurality of times per second to process and record or display.

4. An electronic gauging device according to claim 3, wherein said means connected to the housing comprises a support including a data transmission line.

5. An electronic gauging device according to claim 3, comprising means for transmitting said electrical signals from said housing to a remote location.

6. An electronic gauging device according to claim 3, wherein said electronic measuring means comprises a preamplifier connected to said transducer means, and a multiplexer connected to said preamplifier for transmitting signals to said controller.

7. An electronic gauging device according to claim 1, wherein said means to support the housing comprises a flexible cable connected to the housing to raise and lower the housing into the water flowing in said open channel and permit the housing to swing and adapt itself to the flowing water.

8. An electronic gauging device according to claim 7, comprising a data transmission line in said cable, said electronic measuring means comprising a multiplexer connected to said transducer means and a controller connected to said multiplexer by said data transmission line.

* * * * *